United States Patent
Suzuki et al.

(10) Patent No.: US 9,310,734 B2
(45) Date of Patent: Apr. 12, 2016

(54) FIXING ROLLER AND METHOD OF MANUFACTURING THE SAME

(71) Applicants: Noboru Suzuki, Komaki (JP); Kei Ishida, Nagoya (JP); Takuji Matsuno, Ichinomiya (JP)

(72) Inventors: Noboru Suzuki, Komaki (JP); Kei Ishida, Nagoya (JP); Takuji Matsuno, Ichinomiya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 4 days.

(21) Appl. No.: 13/768,251

(22) Filed: Feb. 15, 2013

(65) Prior Publication Data

US 2013/0209149 A1   Aug. 15, 2013

(30) Foreign Application Priority Data

Feb. 15, 2012 (JP) ................................. 2012-030479

(51) Int. Cl.
*G03G 15/20* (2006.01)
*B29C 43/18* (2006.01)

(52) U.S. Cl.
CPC ............ *G03G 15/2064* (2013.01); *B29C 43/18* (2013.01); *G03G 15/206* (2013.01); *G03G 15/2053* (2013.01); *G03G 15/2057* (2013.01); *G03G 15/2089* (2013.01); *G03G 2215/2061* (2013.01)

(58) Field of Classification Search
CPC .......... G03G 15/2064; G03G 15/2089; G03G 15/2053; G03G 2215/2061
USPC .................. 399/333; 271/119; 492/28, 30
See application file for complete search history.

(56) References Cited

U.S. PATENT DOCUMENTS

| | | | |
|---|---|---|---|
| 5,130,754 A | | 7/1992 | Hishikawa |
| 6,144,832 A | * | 11/2000 | Nimura et al. ................ 399/328 |
| 7,650,106 B2 | | 1/2010 | Kim |
| 8,351,835 B2 | | 1/2013 | Maruyama |
| 2003/0021616 A1 | * | 1/2003 | Yoda et al. .................... 399/329 |
| 2006/0088350 A1 | | 4/2006 | Imamiya |
| 2008/0101829 A1 | | 5/2008 | Kim |
| 2008/0166160 A1 | | 7/2008 | Fukaya et al. |
| 2010/0226698 A1 | | 9/2010 | Maruyama |
| 2011/0183265 A1 | | 7/2011 | Kim et al. |

FOREIGN PATENT DOCUMENTS

| | | |
|---|---|---|
| CN | 1046229 A | 10/1990 |
| CN | 200947169 Y | 9/2007 |
| CN | 101169611 A | 4/2008 |
| CN | 101842750 A | 9/2010 |
| EP | 1033631 A2 | 9/2000 |

(Continued)

OTHER PUBLICATIONS

Machine translation of Takeda, JP 2003-337494 (2003).*

(Continued)

*Primary Examiner* — David Gray
*Assistant Examiner* — Sevan A Aydin
(74) *Attorney, Agent, or Firm* — Banner & Witcoff, Ltd.

(57) ABSTRACT

A fixing roller that may include: a rotary shaft; an elastic layer that is provided at the circumference of the rotary shaft, and a surface layer that covers the circumference of the elastic layer and includes creases, wherein the creases are provided at both axial end portions of the surface layer, and a portion of the surface layer between the axial end portions thereof is smoother than the axial end portions.

4 Claims, 7 Drawing Sheets

(56) References Cited

FOREIGN PATENT DOCUMENTS

| | | | | |
|---|---|---|---|---|
| JP | S63-218982 A | | 9/1988 | |
| JP | 02262684 A | * | 10/1990 | ............ G03G 15/20 |
| JP | 05341684 A | * | 12/1993 | ............ G03G 15/20 |
| JP | 2001317538 A | | 11/2001 | |
| JP | 2002-139940 A | | 5/2002 | |
| JP | 3382611 B2 | | 3/2003 | |
| JP | 2003337494 A | * | 11/2003 | ............ G03G 15/20 |
| JP | 2005091470 A | | 4/2005 | |
| JP | 2007121553 A | | 5/2007 | |
| JP | 2010271656 A | | 12/2010 | |

OTHER PUBLICATIONS

Jan. 27, 2015—(CN) The First Office Action—App 201310051289.5.

Feb. 18, 2005—(EP) Extended European Search Report—App 13155248.1.

Oct. 27, 2015—(CN) The Second Office Action—App 201310051289.5.

* cited by examiner

FIXING ROLLER AND METHOD OF MANUFACTURING THE SAME

CROSS-REFERENCE TO RELATED APPLICATIONS

This application claims priority from Japanese Patent Application No. 2012-030479 filed on Feb. 15, 2012, the entire contents of which are incorporated herein by reference.

TECHNICAL FIELD

Aspects of the invention relate to a fixing roller, which is used for a fixing device and conveys a recording sheet, and a method of manufacturing the same.

BACKGROUND

A fixing device that is used for an image forming apparatus of an electrophotographic type has a fixing roller conveying a recording sheet such as a pressing roller and a heating roller. For example, JP-B-3,382,611 discloses, as a fixing roller, a pressing roller or a heating roller having a core bar, an elastic layer that is provided around the core bar and a fluorine resin tube that covers the elastic layer.

In the fixing roller of the related art, when the fixing roller is not heated, creases are generated on an entire surface thereof. Meanwhile, when the fixing roller is heated, the surface thereof becomes smooth. When the recording sheet is conveyed by the fixing roller that is smooth and has an axially straight shape, wrinkles extending in a conveyance direction are generated on the recording sheet.

SUMMARY

An object of the invention is to suppress wrinkles from being generated on a recording sheet.

According to an aspect of the invention, there is provided a fixing roller. The fixing roller may include: a rotary shaft, an elastic layer, and a surface layer. The elastic layer is provided at the circumference of the rotary shaft. The surface layer covers the circumference of the elastic layer and includes creases. The creases are provided at both axial end portions of the surface layer and a portion of the surface layer between the axial end portions thereof is smoother than the axial end portions.

Accordingly, since the creases are formed on the axial end portions of the surface layer and the portion between the axial end portions is smoother than the axial end portions, it is possible to suppress wrinkles from being generated on the recording sheet. The reason is that when conveying the recording sheet with the fixing roller, the conveying speed of the recording sheet at the end portions becomes faster than that at between the end portions (at the central portion). That is, since the conveying speed of the end portions is faster than that of the central portion, a portion of the sheet being conveyed, which enters between the fixing roller and a member conveying the recording sheet between the fixing roller (nip portion), is tensioned toward the end portions. Thereby, the central portion is tensioned. Hence, it is possible to suppress wrinkles extending along the conveyance direction from being generated on a portion of the sheet delivered from the nip portion.

In the specification, for distinction, the term "crease" indicates one that is generated on a fixing roller and the term "wrinkle" indicates one that is generated on a recording sheet.

According to another aspect of the invention, there is provided a method of manufacturing a fixing roller which includes a rotary shaft, an elastic layer provided at the circumference of the rotary shaft, and a surface layer covering the elastic layer, is configured to be used in a fixing device for heat-fixing a developer image transferred on a recording sheet, and is configured to convey the recording sheet. The method includes: providing the elastic layer and the surface layer at the circumference of the rotary shaft; and forming creases on both axial end portions of the surface layer by pressing a concave-convex surface against the axial end portions of the surface layer.

Accordingly, it is possible to manufacture the fixing roller including the surface layer in which creases are provided on the axial end portions thereof and the portion thereof between the axial end portions is smoother than the axial end portions. Therefore, by using the fixing roller in the fixing device, it is possible to suppress wrinkles from being generated on the recording sheet.

According to another aspect of the invention, there is provided a method of manufacturing a fixing roller which includes a rotary shaft, an elastic layer provided at the circumference of the rotary shaft, and a surface layer covering the elastic layer, is configured to be used in a fixing device for heat-fixing a developer image transferred on a recording sheet, and is configured to convey the recording sheet. The method includes: setting the rotary shaft and the surface layer having a tube shape in a molding tool which has concavity and convexity on a surface thereof that faces both axial end portions of the surface layer; and introducing and hardening a material of the elastic layer into an inner side of the surface layer set in the molding tool.

Accordingly, it is possible to manufacture the fixing roller including the surface layer in which creases are provided on the axial end portions thereof and the portion thereof between the axial end portions is smooth. Therefore, by using the fixing roller for the fixing device, it is possible to suppress wrinkles from being generated on the recording sheet. Further, according to the above-described manufacturing method, since it is possible to form the creases while forming the elastic layer (fixing roller), it is possible to mass-produce the fixing roller.

According to another aspect of the invention, there is provided a method of manufacturing a fixing roller which includes a rotary shaft, an elastic layer provided at the circumference of the rotary shaft, and a surface layer covering the elastic layer, is configured to be used in a fixing device for heat-fixing a developer image transferred on a recording sheet, and is configured to convey the recording sheet. The method includes: providing the elastic layer and the surface layer at the circumference of the rotary shaft; fitting a mold having concavity and convexity on an inner surface thereof to both axial end portions of the surface layer, respectively; and heating the molds and the surface layer.

Accordingly, it is possible to manufacture the fixing roller having the surface layer in which the creases are provided on the axial end portions thereof and the portion thereof between the axial end portions is smooth. Therefore, by using the fixing roller for the fixing device, it is possible to suppress wrinkles from being generated on the recording sheet.

According to the invention, it is possible to suppress wrinkles from being generated on a recording sheet when conveying the recording sheet.

DETAILED DESCRIPTION

Hereinafter, an illustrative embodiment of the invention will be specifically described with reference to the drawings. Meanwhile, in the following descriptions, schematic configurations of a laser printer 1 (image forming apparatus) having a pressing roller 100 as an example of the fixing roller according to an illustrative embodiment of the invention and a fixing device 8 will be briefly described and then a specific configuration of the pressing roller 100 and a method of manufacturing the same will be described.

Figure 1:
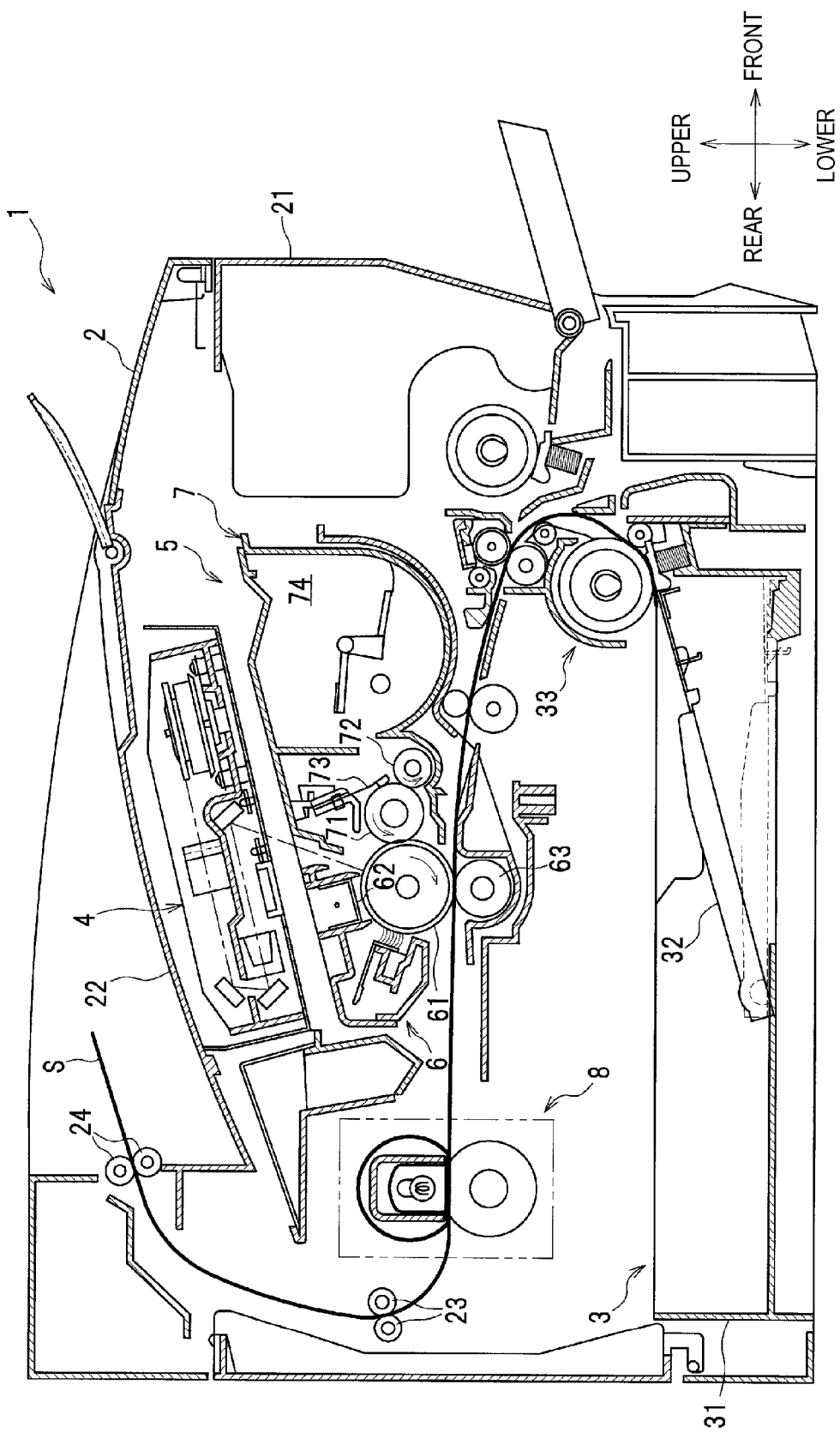
FIG. 1 shows a schematic configuration of a laser printer having a pressing roller that is one example of a fixing roller according to an illustrative embodiment of the invention.

Also, in the following descriptions, the directions are described on the basis of a user who uses the laser printer 1. That is, the right side of FIG. 1 is referred to as the "front side", the left side of FIG. 1 is referred to as the "rear side", the front side of FIG. 1 is referred to as the "left side" and the front side of FIG. 1 is referred to as the "right side". Also, the upper-lower direction of FIG. 1 is referred to as the "upper-lower direction".

<Schematic Configurations of Laser Printer and Fixing Device>

As shown in FIG. 1, the laser printer 1 mainly has, in a body housing 2, a feeder unit 3 that feeds a sheet S, which is an example of the recording sheet, an exposure device 4, a process cartridge 5 that transfers a toner image (developer image) onto the sheet S and a fixing device 8 that heat-fixes the toner image transferred on the sheet S.

The feeder unit 3 is provided at a lower part in the body housing 2 and mainly has a sheet feeding tray 31, a sheet pressing plate 32 and a sheet feeding mechanism 33. The sheet S accommodated in the sheet feeding tray 31 is upwardly pressed by the sheet pressing plate 32 and is fed toward the process cartridge 5 (between a photosensitive drum 61 and a transfer roll 63) by the sheet feeding mechanism 33.

The exposure device 4 is arranged at an upper part in the body housing 2 and has a laser emitting unit (not shown), a polygon mirror, a lens, a reflector and the like whose reference numerals are omitted. In the exposure device 4, a laser light (refer to the dotted-dashed line) based on image data, which is emitted from the laser emitting unit, is scanned on a surface of the photosensitive drum 61 at high speed, thereby exposing the surface of the photosensitive drum 61.

The process cartridge 5 is disposed below the exposure device 4 and is detachably mounted to the body housing 2 through an opening that is formed when a front cover 21 provided to the body housing 2 is opened. The process cartridge 5 has a drum unit 6 and a developing unit 7.

The drum unit 6 mainly has the photosensitive drum 61, a charger 62 and the transfer roller 63. Also, the developing unit 7 is detachably mounted to the drum unit 6 and mainly has a developing roller 71, a supply roller 72, a layer thickness regulation blade 73 and a toner accommodation unit 74 that accommodates therein toner (developer).

In the process cartridge 5, the surface of the photosensitive drum 61 is uniformly charged by the charger 62 and then exposed by the high-speed scanning of the laser light emitted from the exposure device 4, so that an electrostatic latent image based on image data is formed on the photosensitive drum 61. Also, the toner in the toner accommodation unit 74 is supplied to the developing roller 71 via the supply roller 72, is introduced between the developing roller 71 and the layer thickness regulation blade 73 and is carried on the developing roller 71 as a thin layer having a predetermined thickness.

The toner carried on the developing roller 71 is supplied from the developing roller 71 to the electrostatic latent image formed on the photosensitive drum 61. Thereby, the electrostatic latent image becomes visible and a toner image is thus formed on the photosensitive drum 61. Then, the sheet S is conveyed between the photosensitive drum 61 and the transfer roller 63, so that the toner image on the photosensitive drum 61 is transferred onto the sheet S.

Figure 2:
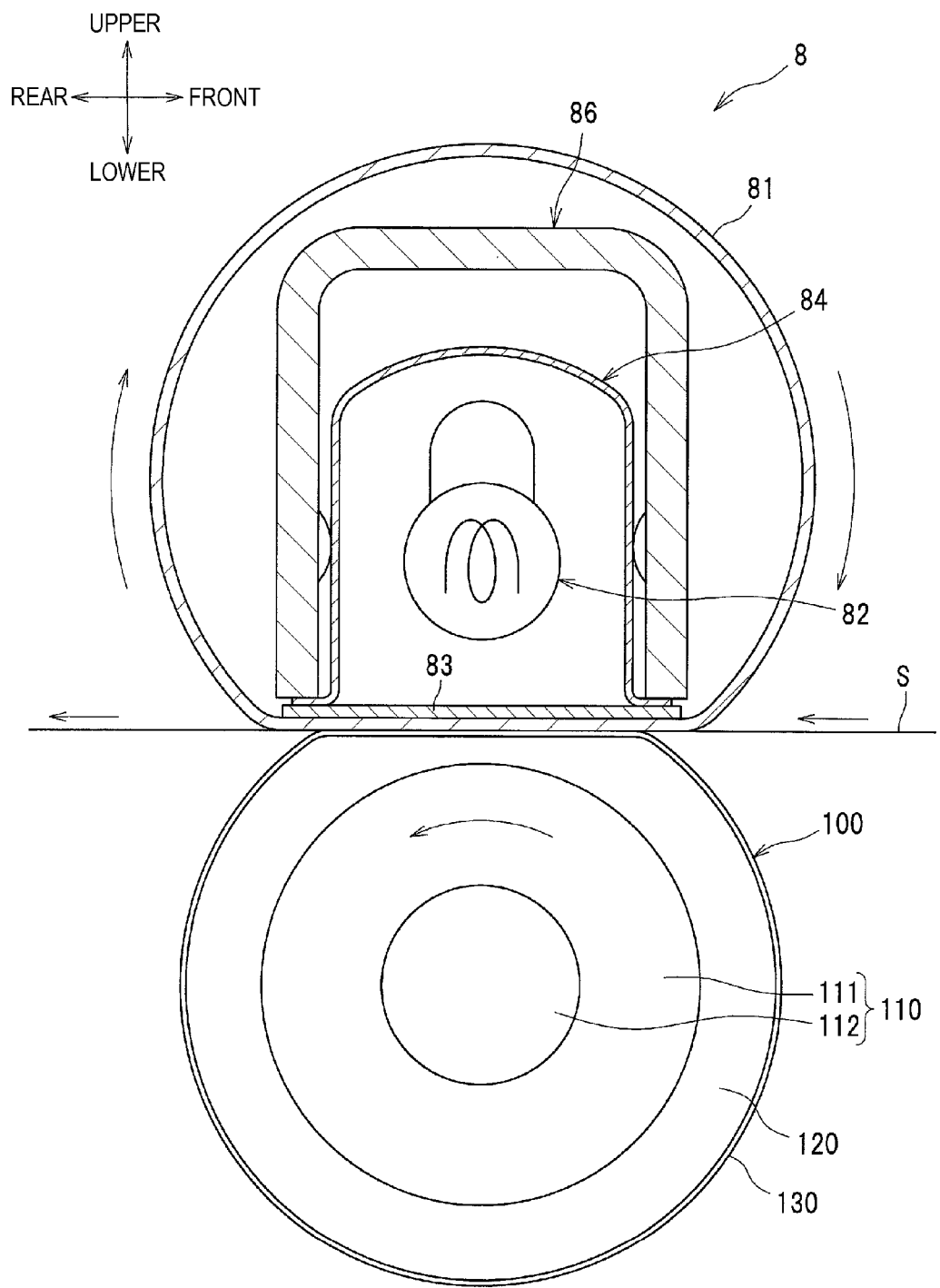
FIG. 2 shows a schematic configuration of a fixing device having the pressing roller.

The fixing device 8 is arranged at the rear of the process cartridge 5 and mainly has a fixing belt 81, a halogen lamp 82 (heat source), a nip plate 83, a reflection plate 84, a pressing roller 100 (fixing roller) and a stay 160, as shown in FIG. 2.

The fixing belt 81 is an endless belt having a cylindrical shape. The fixing belt 81 has heat resistance and flexibility and rotation thereof is guided at both end portions by a guide member (not shown).

The halogen lamp 82 is a heater that generates heat by energization to thus heat the nip plate 83 and the fixing belt 81, thereby heating the toner transferred on the sheet S. The halogen lamp 82 is arranged at the inside of the fixing belt 81.

The nip plate 83 is a plate-shaped member that receives the radiation heat from the halogen lamp 82, and is arranged to slidingly contact an inner surface of the fixing belt 81. The nip plate 83 transfers the radiation heat, which is received from the halogen lamp 82, to the toner on the sheet S through the fixing belt 81. Therefore, the nip plate 83 is made of a material having high thermal conductivity, for example, aluminum plate.

The reflection plate 84 is a member that reflects the radiation heat from the halogen lamp 82 toward the nip plate 83, and is arranged to surround the halogen lamp 82 at the inside of the fixing belt 81. The reflection plate 84 is formed by bending a plate such as aluminum plate and the like having high reflectance of the infrared and far-infrared into a substantial U shaped section.

The pressing roller 100 is a roller that conveys the sheet S between the fixing belt 81 and presses the toner transferred onto the sheet S, and is arranged below the nip plate 83 with the fixing belt 81 being interposed therebetween. The pressing roller 100 rotates by a driving force is transferred thereto from a motor (not shown) provided in the body housing 2. As the pressing roller 100 rotates, it rotates the fixing belt 81 by a frictional force between the fixing belt 81 (or sheet S).

The stay 86 is a member that supports the nip plate 83 via the reflection plate 84 to thus secure the rigidity of the nip plate 83 to which load is applied from the pressing roller 100, and is arranged to cover the reflection plate 84. The stay 86 is formed by bending a plate having relatively high rigidity, for example a steel plate and the like.

In the fixing device 8, the sheet S having the toner image transferred thereto is conveyed between the heated fixing belt 81 and the pressing roller 100, so that the toner image (toner) is heat-fixed on the sheet S by heat and pressure. As shown in FIG. 1, the sheet S having the toner image heat-fixed thereto is discharged onto a sheet discharge tray 22 by conveyance rollers 23, 24.

<Specific Configuration of Pressing Roller>

Figure 3A:
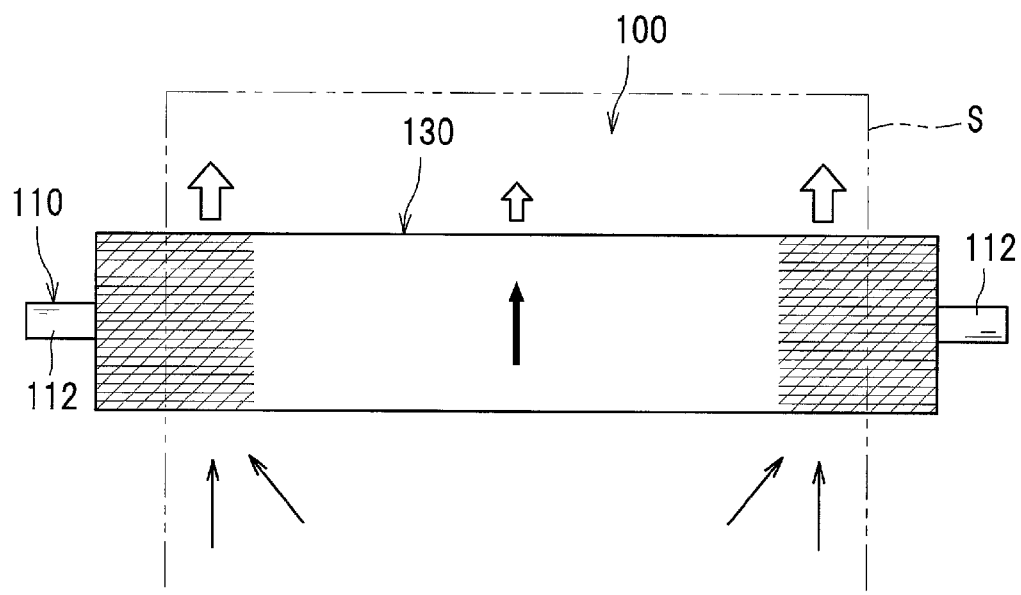
FIG. 3 is a front view (FIG. 3A) and a sectional view (FIG. 3B) of the pressing roller.
Figure 3B:
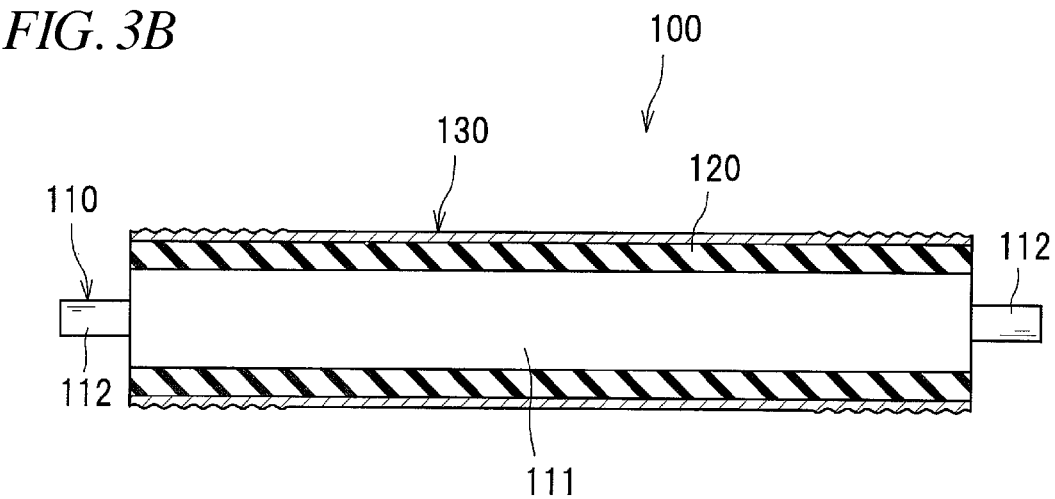

As shown in FIGS. 3A and 3B, the pressing roller 100 mainly has a rotary shaft 110, an elastic layer 120 provided at the circumference of the rotary shaft 110 and a surface layer 130 covering the elastic layer 120.

The rotary shaft 110 is made of metal and has a cylindrical core bar part 111 that is covered by the elastic layer 120 and supported parts 112 that extend axially outwards from both end portions of the core bar part 111 and have a diameter smaller than the core bar part 111. The supported parts 112 are rotatably supported by a housing (not shown) of the fixing device 8 so that the rotary shaft 110 (pressing roller 100) is mounted to the fixing device 8. The core bar part 111 covered by the elastic layer 120 has a straight shape having a constant outer diameter.

The elastic layer 120 is a layer made of silicon rubber and the like and having heat resistance and elasticity. When the pressing roller 100 is mounted to the fixing device 8, the pressing roller 100 contacts the nip plate 83 via the fixing belt 81, so that the elastic layer 120 is mainly elastically deformed. Reactive force that is resultantly generated presses the toner on the sheet S that is being conveyed between the pressing roller 100 and the fixing belt 81.

The surface layer 130 is a member made of fluorine resin and the like and having a tube shape and has a configuration where creases are provided at both axial end portions thereof and a central portion between both axial end portions is smoother than both axial end portions (creases are not provided at the central portion, unlike both end portions). More specifically, creases having a mesh shape are provided to the axial end portions of the surface layer 130, which corresponds to both width end portions of the sheet S that can be conveyed by the fixing device 8 and has a predetermined size or larger (for example, letter size, A4 size, B5 size and the like), form the end edges of the surface layer 130. Specifically, creases are provided to the surface layer 130 over a range overlapping with both width end portions of the sheet S having a predetermined size or larger from end edges of the surface layer 130.

Meanwhile, the creases on the surface layer 130 are configured so that they are maintained (they are not smoothed) even upon the heating, unlike the fixing roller of JP-B-3,382,611. The creases formed on the surface layer 130 may reach the elastic layer 120. Also, preferably, the formation range of the creases from both end edges of the surface layer 130 may be appropriately set by an experiment and the like, depending on the fixing device 8 or the laser printer 1 (image forming apparatus) in which the pressing roller 100 (fixing roller) is used.

Hereinafter, the operations and effects of the above-described pressing roller 100 will be described.

As shown in FIG. 3A, the pressing roller 100 is configured so that the creases are formed on the end portions of the surface layer 130 and the central portion of the surface layer 130 is smoother than the end portions thereof. Hence, when conveying the sheet S between the pressing roller and the fixing belt 81 (which is not shown in FIG. 3), it is possible to make the conveying speed of the sheet S faster at the end portions than at the central portion.

It is thought that the reasons are as follows. That is, since the creases are formed, the end portions of the surface layer 130 can be more easily stretched. Thus, in particular, when the elastic layer 120 is expanded due to the heat, diameters of the end portions of the pressing roller 100 increase (are apt to increase), compared to a diameter of the central portion. Also, even at a state where the heat is not applied to the pressing roller 100, the diameters of the end portions of the pressing roller 100 increase (are apt to increase) due to force with which the elastic force 120 expands, compared to the diameter of the central portion.

Since the conveying speed of the end portions is faster than that of the central portion, an upstream portion of the sheet S in the conveyance direction, which enters between the pressing roller 100 and the fixing belt 81 (nip portion), is tensioned toward the end portions, as shown with arrows. As a result, the central portion is tensioned. Thereby, it is possible to suppress wrinkles extending along the conveyance direction from being generated on a downstream portion of the sheet in the conveyance direction delivered from the nip portion.

Also, in the illustrative embodiment, since the creases of the surface layer 130 are formed in the mesh shape, compared to a configuration where the creases of the surface layer 130 extend in the same direction (for example, the left-right direction of FIG. 3), the conveying speeds between the end portions and the central portion of the sheet are apt to become different. Thereby, it is possible to further suppress wrinkles from being generated on the sheet S.

Meanwhile, in the illustrative embodiment, the outer diameter of the rotary shaft 110 (core bar part 111) is constant. Thus, when the elastic layer 120 is inevitably expanded due to the heat, the diameter of the central portion is more apt to increase, compared to the diameters of the end portions. When the diameter of the central portion becomes larger than those of the end portions, the conveying speed of the sheet S becomes faster at the central portion than at the end portions, so that wrinkles are apt to be generated on the sheet S. However, in the illustrative embodiment, since the creases are formed on the end portions of the surface layer 130, even in the configuration where the outer diameter of the core bar part 111 is constant, the conveying speed of the sheet S becomes faster at the end portions than at the central portion, as described above, so that it is possible to suppress the conveying speed from increasing at the central portion. As a result, it is possible to effectively suppress wrinkles from being generated on the sheet S.

<Method of Manufacturing Pressing Roller>

Hereinafter, three examples of a method of manufacturing the pressing roller 100 be described.

[First Example of Manufacturing Method]

in the manufacturing method, a pressing roller which has the elastic layer 120 and the surface layer 130 provided at the circumference of the rotary shaft 110 but has no creases is prepared by using a well-known method. As an example, the pressing roller having no creases may be manufactured by setting a tube becoming the surface layer 130 and the rotary shaft 110 in a mold having a cylindrical cavity and press-introducing and hardening a material of the elastic layer 120 between the tube and the rotary shaft 110.

Figure 4:
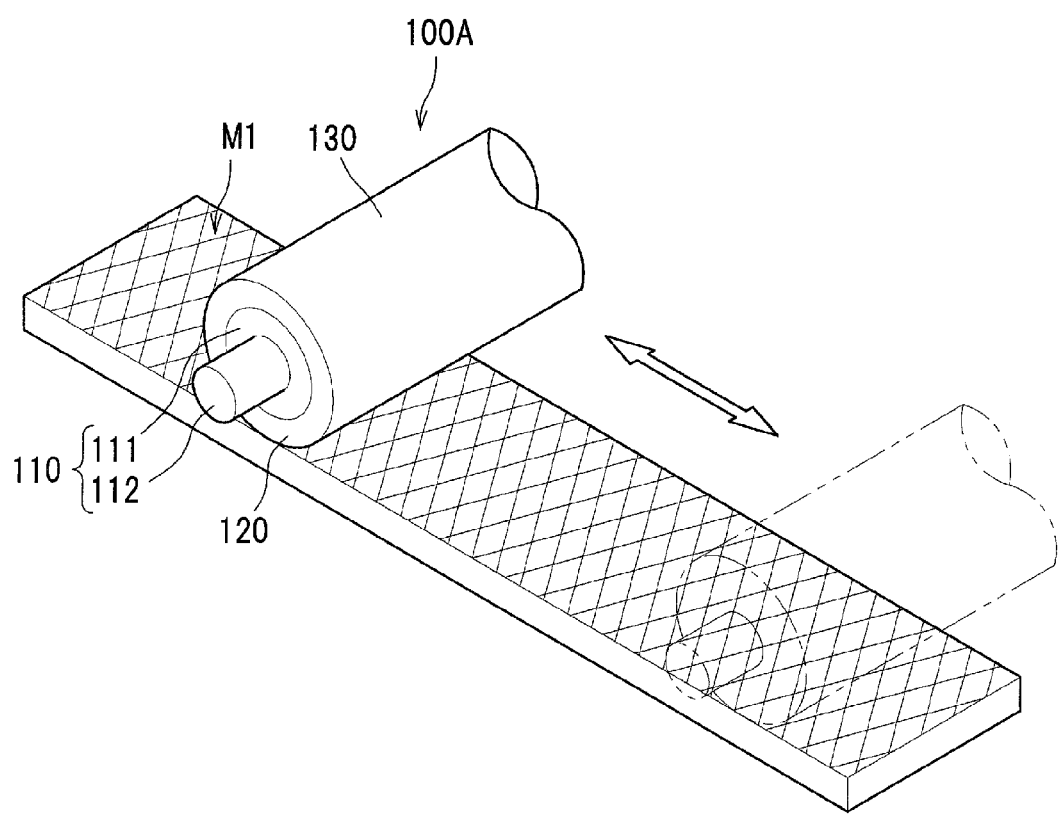
FIG. 4 illustrates a first example of a method of manufacturing the pressing roller.

After that, as shown in FIG. 4, both axial end portions (only one end portion is shown) of a roller part (surface layer 130) of a pressing roller 100A having no creases are pressed against a concave-convex surface M1 having a mesh shape corresponding to creases and the pressing roller 100A is rolled on the concave-convex surface M1, so that it is possible to manufacture the pressing roller 100A having creases formed on both end portions of the surface layer 130. In the meantime, when pressing the surface layer 130 against the concave-convex surface M1, it is preferable to perform the pressing while heating the concave-convex surface M1 or after heating the concave-convex surface M1.

According to the above-described manufacturing method, it is possible to manufacture the pressing roller 100 having the surface layer 130 having the creases formed on both end portions and the central portion smoother than both end portions thereof. Then, the pressing roller 100 is used for the fixing device 8, so that it is possible to suppress wrinkles from being generated on the sheet S, as described above.

Also, the concave-convex surface M1 is heated when pressing the surface layer 130 against the concave-convex surface M1. Thereby, the surfaces of both end portions of the surface layer 130 on which the creases are formed is difficult to return to the original shape (a state where there are no creases). As a result, it is possible to keep the wrinkle suppressing effect of the manufactured pressing roller 100 for a long time.

Second Example of Manufacturing Method

In the manufacturing method, the creases are formed while forming the pressing roller 100.

Figure 5C:
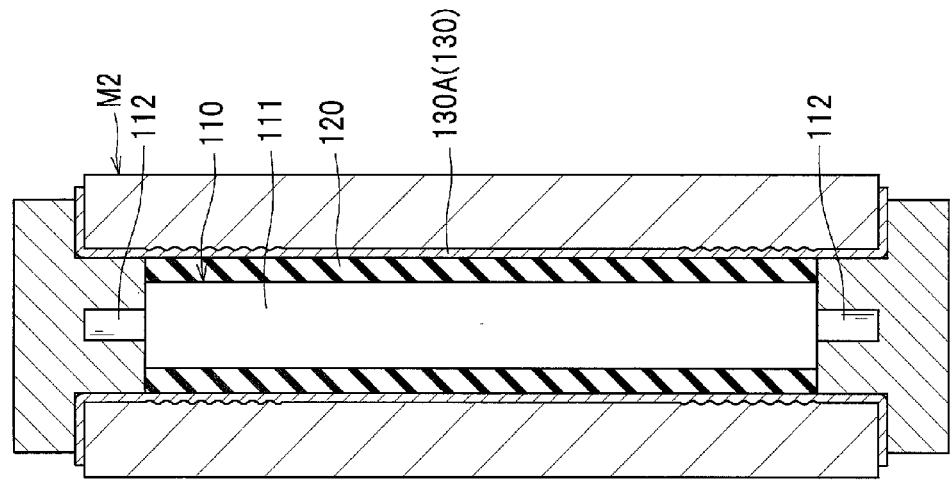
FIG. 5 illustrates a second example of a method of manufacturing the pressing roller (FIG. 5A to 5C)
Figure 5B:
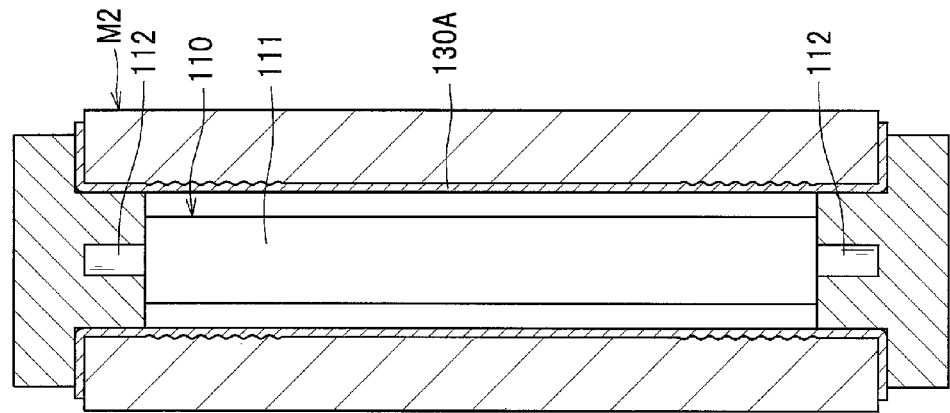
Figure 5A:
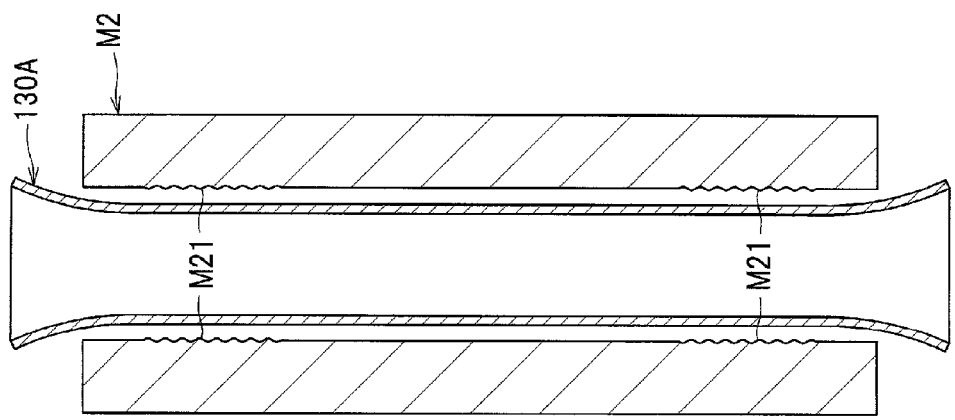

Specifically, in the method, as shown in FIG. 5A, a surface of a mold M2 (molding tool) having a cylindrical cavity for forming the pressing roller 100, which faces both axial end portions of the surface layer 130, is formed with concavity and convexity M21 corresponding to the creases. A tube 130A becoming the surface layer 130 is set in the mold M2.

Then, as shown in FIG. 5B, the rotary shaft 110 is set in the tube 130A set in the mold M2 and both end portions of the cylindrical mold M2 are closed. After that, as shown in FIG. 5C, a material of the elastic layer 120 is press-introduced and hardened at an inner side of the tube 130A (between the tube 130A and the core bar part 111), so that it is possible to manufacture the pressing roller 100 having creases formed on the surface layer 130, which correspond to the concavity and convexity M21.

According to the above-described manufacturing method, it is also possible to manufacture the pressing roller 100 having the surface layer 130 having the creases formed on both end portions and the central portion smoother than both end portions thereof. Thus, by using the pressing roller 100 for the fixing device 8, it is possible to suppress the wrinkle from occurring on the sheet S.

[Third Example of Manufacturing Method]

Figure 6A:
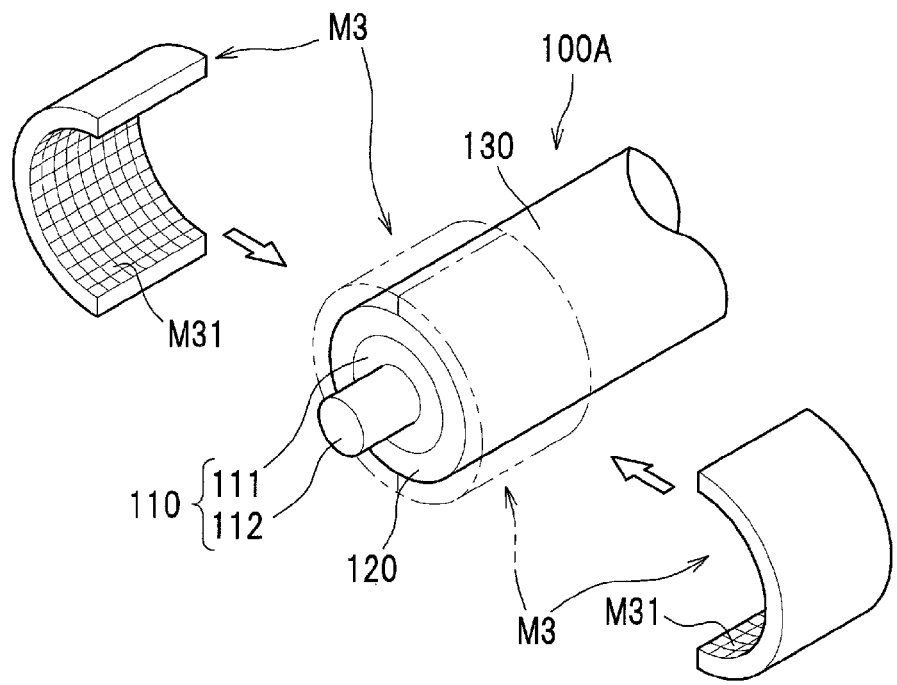
FIG. 6 illustrates a third example of a method of manufacturing the pressing roller (FIGS. 6A and 6B)
Figure 6B:
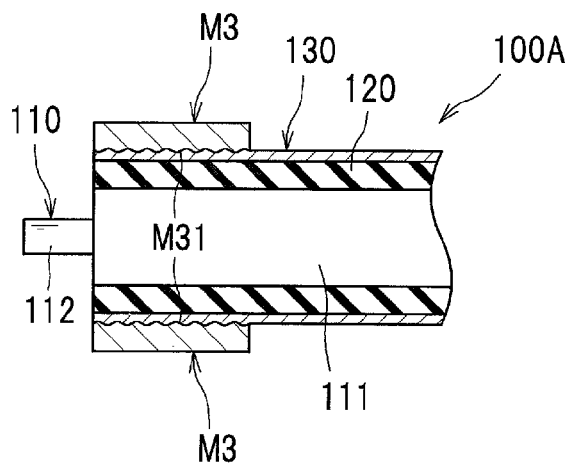

In the manufacturing method, a pressing roller which has the elastic layer 120 and the surface layer 130 provided at the circumference of the rotary shaft 110 but has no creases is prepared by using a well-known method, like the first example. Also, as shown in FIGS. 6A and 6B, inner surfaces of a pair of molds M3, which are for forming creases, have a semicircular tube shape, and can be fitted onto both axial end portions (only one end portion is shown) of a roller part of a pressing roller 100A, are formed with concavity and convexity M31 corresponding to the creases, respectively.

The pair of molds M3 for forming creases is fitted and fixed onto both axial end portions of the pressing roller 100A having no creases, respectively, while pressing the concavity and convexity M31 against the surface layer 130. After that, the pressing roller 100A having the molds M3 for forming creases fitted on both end portions thereof is put into a furnace for heating and is heated, so that it is possible to manufacture the pressing roller 100 having creases formed on both end portions of the surface layer 130.

According to the above-described manufacturing method, it is also possible to manufacture the pressing roller 100 having the surface layer 130 having the creases formed on both end portions and the central portion smoother than both end portions thereof. Thus, by using the pressing roller 100 for the fixing device 8, it is possible to suppress wrinkles from being generated on the sheet S.

In the first or third example where the creases are formed on both end portions after the pressing roller 100A having no creases is prepared, since the process for forming the creases is added, the manufacturing processes are increased. However, in the second example where the creases are formed while forming the pressing roller 100, it is possible to manufacture the pressing roller 100 having the creases formed thereon by using the substantially equivalent processes to the manufacturing processes of the related-art pressing roller having no creases.

Meanwhile, in the second example, the creases are formed inside the molding tool M2. Thus, the creases of the pressing roller 100 are engaged with the concavity and convexity M21 of the mold M2, so that it is difficult to detach the pressing roller 100 from the mold M2. Thus, there is a possibility that a shape of a formable crease may be limited to some extent. However, in the third or first example (particularly, third example), the creases are formed on the molded pressing roller 100A. Hence, the problem that it is difficult to detach the pressing roller 100A from the mold does not occur, so that it is possible to improve a degree of freedom in the shape of the formable crease.

Although the illustrative embodiment of the invention has been described, the invention is not limited to the illustrative embodiment. The specific configurations can be appropriately changed without departing from the gist of the invention.

Figure 7:
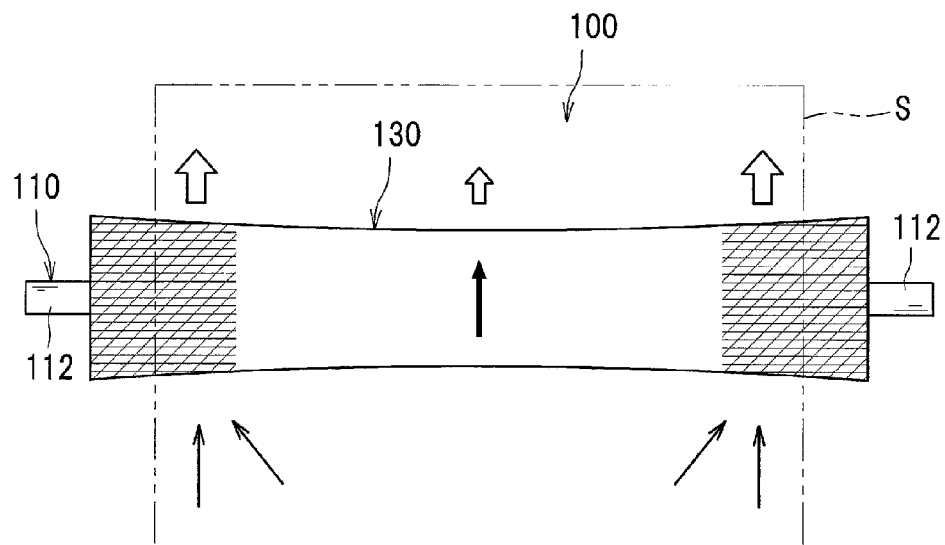
FIG. 7 is a front view of a pressing roller according to a modified embodiment.

In the above-described illustrative embodiment, the pressing roller 100 has the straight shape in which the diameters of both axial end portions are substantially the same as that of the central portion at a state before the creases are formed on both end portions. However, the invention is not limited thereto. For example, as shown in FIG. 7, the pressing roller 100 may have a concave shape in which the diameters of both axial end portions are larger than that of the central portion at least at a state before creases are formed on at least both end portions. The roller having the concave shape can make the conveying speed of the sheet S faster at both end portions than at the central portion, so that it is possible to suppress wrinkles of the sheet S. Hence, when creases are formed on the surface layer 130 of the pressing roller 100 having the concave shape, it is possible to further suppress wrinkles from being generated on the sheet S.

Note that, regarding the roller having the concave shape, when an amount of depression at the central portion is made larger (when the diameter of the central portion is made smaller than those of both end portions), although it is possible to increase the wrinkle suppressing effect on the sheet S, since the pressing force decreases at the central portion, the fixing inferiority of the toner may occur. Meanwhile, according to the pressing roller 100 of the illustrative embodiment shown in FIG. 3, while the creases formed on both end portions of the surface layer 130 suppress wrinkles from being generated on the sheet S, it is possible to suppress the fixing inferiority as described above owing to the straight shape. Further, regarding the pressing roller 100 of the modified embodiment shown in FIG. 7, since it is possible to exhibit the wrinkle suppressing effect on the sheet S by the creases, it is not necessary to make the amount of depression so large at the central portion. Therefore, according to the pressing roller 100 of the modified embodiment shown in FIG. 7, while it is possible to effectively suppress wrinkles from being generated on the sheet S by a synergetic effect of the creases of the surface layer 130 and the concave shape, it is possible to suppress the fixing inferiority by suppressing the amount of depression at the central portion, compared to the pressing roller that suppresses the wrinkle only with the concave shape.

In the above-described illustrative embodiment, as shown in FIG. 3A, the creases are formed within the substantially same range (length) from both end edges of the surface layer 130. However, the invention is not limited thereto. That is, the formation ranges of the creases from the end edges of the surface layer 130 may be different between the one range and the other range. For example, in a configuration where a recording sheet is conveyed based on one side in the width direction (the sheet is conveyed while being lined at one side in the width direction), the formation range of the creases at the other side may be larger than the formation range at the one side.

In the above-described illustrative embodiment, the creases of the surface layer 130 are formed in the mesh shape. However, the invention is not limited thereto. For example, in FIG. 3A, a configuration is also possible in which the creases of the surface layer 130 simply extend in the left-right direction of FIG. 3.

In the above-described illustrative embodiment, the core bar part 111 has a straight shape having the constant outer diameter. However, the invention is not limited thereto. For example, in FIG. 3B, the core bar part 111 may have a crown shape in which a diameter of the axial central portion is larger than those of both axial end portions. In this configuration, since it is possible to make the central portion of the elastic layer 120 thinner than both end portions, it is possible to suppress the diameter of the central portion from being more increased than the diameters of both end portions when the elastic layer 120 is expanded due to the heat.

In the above-described illustrative embodiment, the configuration of the fixing device in which the fixing roller of the invention is used is exemplary and is not limited to the above-described configuration. For example, in the above-described illustrative embodiment, the fixing device 8 has the fixing belt 81. However, the invention is not limited thereto. For example, instead of the fixing belt 81, a metal roller (so-called heating roller) having a circular tube shape may be provided. Also, in the above-described illustrative embodiment, the fixing device S has the halogen lamp 82 (halogen heater) as the heat source. However, the invention is not limited thereto. For example, the heat source may be a carbon heater, an IH heater, a ceramic heater and the like.

In the above-described illustrative embodiment, the pressing roller 100 is exemplified as the fixing roller. However, the invention is not limited thereto. For example, the fixing roller may be a heating roller having an elastic layer and a surface layer provided at the circumference of a rotary shaft (core bar) having a circular tube shape. Also, the fixing device in which the fixing roller of the invention is used may have a configuration where the recording sheet is conveyed between a heating roller having creases formed on both end portions of a surface layer thereof and a pressing roller having creases formed on both end portions of a surface layer thereof.

In the above-described illustrative embodiment, the laser printer 1 that forms a monochrome image is exemplified as the image forming apparatus in which the fixing roller of the invention is used. However, the invention is not limited thereto. For example, a printer that forms a color image is also possible. Also, the image forming apparatus is not limited to the printer and may be a copier or a multi-functional machine having a document reading device such as flat bed scanner.

Embodiments

Hereinafter, an embodiment by which the effect (wrinkle suppressing effect) of the invention has been confirmed will be described.

In this embodiment, any one pressing roller (fixing roller) of embodiment 1 and comparative examples 1 and 2, which will be described later, was mounted to the fixing device having the configuration as shown in FIG. 2, the fixing device was attached to a laser printer and image formation (solid printing of a constant density) was performed to sheets (123 to 126 sheets). Then, the number of sheets on which wrinkles were generated was checked.

The experiment conditions were as follows.
Sheet: Letter size (216 mm×280 mm)
Pressing roller (common to embodiment 1 and comparative examples 1 and 2)
  Length (length of the elastic layer): 232.9 mm
  Outer diameter: 29.4 mm
  Outer diameter of the rotary shaft (core bar part): 21.4 mm
  Thickness of the surface layer: 35 µm
In the embodiment 1, the creases were formed within the range of 35 mm from both end edges of the surface layer, respectively.
In the comparative example 1, the creases were formed over the entire surface layer.
In the comparative example 2, the creases were not formed on the surface layer (the entire surface layer was smooth).
The results are shown in the following table 1.

TABLE 1

| | number of sheets on which wrinkles are generated/ total number of sheets |
|---|---|
| Embodiment 1 (having creases on both end portions) | 0 sheet/123 sheets |
| Comparative Example 1 (having creases over entire surface layer) | 124 sheets/124 sheets |
| Comparative Example 2 (having no creases) | 93 sheets/126 sheets |

As shown in the table 1, in the embodiment 1 in which the creases were formed on both end portions of the surface layer, the image formation was performed for 123 sheets but no wrinkles were generated on the sheets. On the other hand, in the comparative example 1 in which the creases were formed on the entire surface layer, wrinkles extending in the conveyance direction (longitudinal direction of the sheet) were generated on all of 124 sheets for which the image formation was performed. Also, in the comparative example 2 in which no creases were formed, wrinkles extending in the conveyance direction were generated on 93 sheets, which was 70% or higher of 126 sheets to which the image formation was performed.

From the above-described results, it was confirmed that the pressing roller having the creases formed on both end portions of the surface layer can suppress wrinkles from being generated on the sheet.

In addition to the above-described experiment, the pressing rollers having creases formed within the ranges of 20 mm, 30 mm and 40 mm from both end edges of the surface layer were respectively prepared and the image formation was performed for the sheets at the same conditions. The results are shown in FIG. 8.

Figure 8:
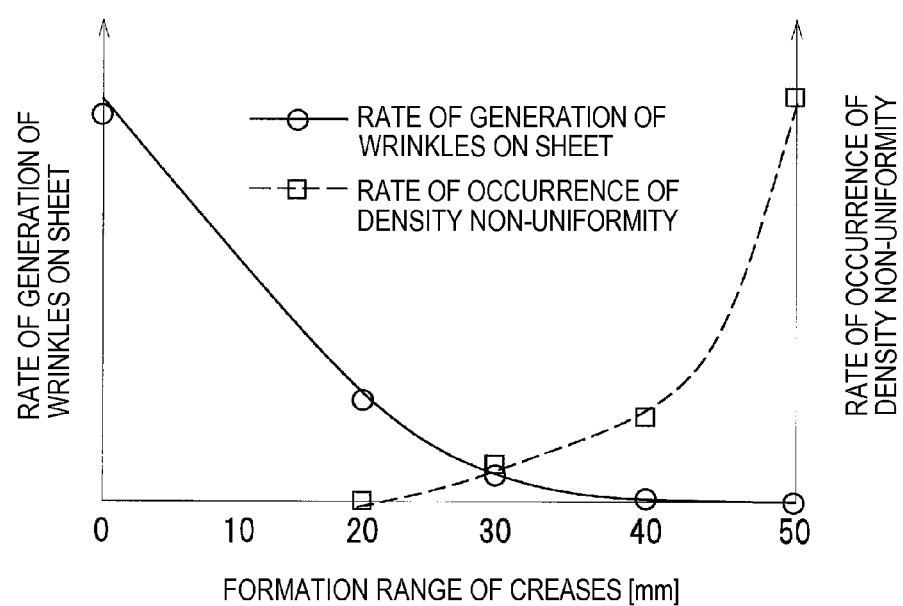
FIG. 8 is an experimental result showing a relation among a formation range of creases from both end portions of a surface layer, a rate of generation of wrinkles on a sheet and a rate of occurrence of density non-uniformity.

As shown in FIG. 8, in the pressing rollers having creases formed on both end portions of the surface layer (20 to 50 mm), a rate of generation of wrinkles on the sheet was much lower, compared to the pressing roller (0 mm) having no crease formed on the surface layer. However, when the formation range of creases from both end edges of the surface layer is increased, a ratio of occurrence of density non-uniformity; which forms a substantial U shape in a portion of an image, is increased. Therefore, regarding at least the pressing roller of the above-described conditions (length: 232.9 mm, outer diameter: 29.4 mm, outer diameter of the rotary shaft: 21.4 mm and thickness of the surface layer: 35 μm), it is preferable to form the creases within the range of 20 to 40 mm from both end edges of the surface layer, from the standpoint of image quality.

What is claimed is:

1. A fixing roller comprising:
    a rotary shaft rotatable about an axis extending along an axial direction;
    an elastic rubber layer that is provided at a circumference of the rotary shaft; and
    a fluorine resin tube that covers a circumference of the elastic rubber layer and includes creases, the creases formed in a mesh shape comprising:
        a first crease extending in a first direction; and
        a second crease extending in a second direction different from the first direction and intersecting with the first crease,
    wherein an outer circumferential surface of the fluorine resin tube includes axial end portions to which the creases are provided, and a central portion provided between the axial end portions, the central portion being smoother than both axial end portions,
    wherein the creases are distributed over an entire area of both axial end portions of the fluorine resin tube,
    wherein an outer peripheral surface of the elastic rubber layer includes first portions, each of the first portions covered by a respective one of the axial end portions of the fluorine resin tube provided with the creases, and a second portion covered by the central portion of the fluorine resin tube,
    wherein the first portions of the outer peripheral surface of the elastic rubber layer are smoother than the axial end portions of the fluorine resin tube provided with the creases, and
    wherein the axial end portions of the fluorine resin tube are spaced apart from each other by a predetermined distance, the predetermined distance being less than a width of a recording sheet, in the axial direction, that is to be conveyed by the fixing roller, the creases configured to contact the recording sheet.

2. The fixing roller according to claim 1, wherein a dimension of at least one of the axial end portions of the fluorine resin tube is within a range of 20 mm to 50 mm in an axial direction of the fixing roller.

3. The fixing roller according to claim 1, wherein the axial end portions are spaced apart from each other by a predetermined distance that is less than 216 mm, which is equal to a width of a letter sized paper, and greater than 152.9 mm.

4. The fixing roller according to claim 1, wherein the creases are formed by applying a concave-convex surface against the fluorine resin tube.

* * * * *